April 21, 1970     D. R. CRETE     3,507,574

COLOR ENLARGER AND PRINTER

Filed Oct. 14, 1968

INVENTOR.
DARREL R. CRETE
BY
Boyken, Mohler, Foster & Schlemmer

ATTORNEYS

United States Patent Office 3,507,574
Patented Apr. 21, 1970

3,507,574
COLOR ENLARGER AND PRINTER
Darrel R. Crete, Sacramento, Calif., assignor to
Charles A. Crete, Marysville, Calif.
Filed Oct. 14, 1968, Ser. No. 767,287
Int. Cl. G03b 27/78, 27/52
U.S. Cl. 355—38         6 Claims

ABSTRACT OF THE DISCLOSURE

A conventional enlarger and easel are adapted for automatic color enlarging and printing by the temporary positioning therebetween of a deck assembly containing a detector of the intensities of the primary colors in a beam passing therethrough and a color compensator including filters of the primary colors positionable in the beam. The deck assembly is operated by a suitable control circuit which may be part of a commercial printer which has been adapted for alternative operation of the commercial printer or of the deck assembly.

Background of the invention

The invention relates to printers and enlargers for color photographs, and particularly to printers and enlargers wherein the fidelity of the colors in a print is increased by supplementing the white light by which prints are ordinarily made with light of a different color depending upon the characteristics of the negative to be printed.

Heretofore, in making color enlargements of any desired or undetermined size from color negatives, a series of test prints are first made, utilizing different filter combinations, and visibly comparing the various prints to determine which has the truest colors. Hours, and even days, may be expended in doing this for a single print.

The excessive time involved by the foregoing procedure, and the high cost thereof, including the cost of materials, resulted in the development of automatic commercial color printers well known in the industry, such as "Eastman" color printers, and "Pako" or "Pakotronic" color printers, but in each instance the printers are limited as to the width of the printing paper they are capable of using, and those capable of making 8″ x 10″ or 11″ x 14″ prints are too costly for the average commercial studio. The automatic color printers are limited to making the enlargements called "Jumbo" prints on paper up to 5″ in width from smaller-size negatives, are relatively economical and are widely used in most photo developing and photo finishing establishments.

The operation of the automatic, or substantially automatic, color printers is quite similar. White light is projected upwardly through the negative and then through what may be called a lens deck assembly and through an enclosed passageway onto the photographic paper, the paper being in a roll of limited predetermined maximum width which determines one of the dimensions of the print. Within the deck assembly is a color compensator including a shutter, and filters of the three primary colors, each of which is adapted to be moved across the path of the light that is projected onto the paper, and one or more detectors by which the amounts of the three primary colors present in the light that has passed through the negative at any given instant may be determined. The printer, separate from the lens deck assembly, contains electronic circuitry which receives the information as to color distribution from the detector or detectors and effects actuation of the shutter and filters in the color compensator or deck assembly to move into and out of the light path to expose the paper and to compensate for any irregularities in this color distribution. The electronic circuitry also contains manually actuated controls by which an operator may manually make adjustments to compensate for gross irregularities in the colors in a particular negative. In substantially normally exposed negatives, such manual controls are not employed, inasmuch as compensation is automatically made for minor irregularities.

In these conventional automatic color printers, the negative, when positioned in the light path, is open to visual observation thus enabling the operator to determine the irregularities in the colors of a negative and to make a manual adjustment, if required, as above noted. However, the operator cannot see the printing paper, nor is the light projected onto the paper accessible for dodging, and the prints are of predetermined limited size. The high costs of the automatic printers for making 8″ x 10″ or 11″ x 14″ prints is prohibitve for any but the largest photographic developing and process establishments.

Virtually all commercial photo developing and finishing establishments, and many individuals have the conventional enlargers for making black and white prints of any size within the limits of the easel and lens. The printing light rays are readily accessible to the operator for dodging or burning in, and the printing paper is visible at all times to observe the processing as it proceeds.

Summary of the invention

The invention enables a photo developing and finishing establishment of modest size, and individuals, to not only make true color enlargements of an indetermined number of larger sizes, which sizes are only limited by the distance between the paper easel and the projection lens, but such prints may be made on the conventional enlarger for making black and white prints by adding a lens deck only, such as used on the color enlargers for making "Jumbo" prints, and utilizing the electronic circuitry of the smaller color enlarger.

Thus, the smaller, and relatively modest photo developing and finishing establishments are enabled, by the employment of the economical lens deck from the smaller commercial color enlarger by use of the black and white enlarger together and the existent electronic circuitry of the former, to produce accurate color and black and white enlargements in virtually any desired size, as well as the so-called "Jumbo" prints.

One of the objects of the invention is to provide the foregoing combination for accomplishing the results described.

Another object of the invention is to provide an automatic color printer and enlarger utilizing conventional enlarging equipment for making black and white enlargements.

Another object of the invention is to provide an automatic color printer and enlarger in which the operator has access to the photographic paper during the printing process and which enlarger is adapted to make black and white and color enlargements of identically the same size and which sizes are outside the range of present automatic color prints.

Still another object of the invention is to provide a generally improved automatic color enlarger and printer.

Other objects of the invention will be apparent from the drawings, specification and claims included herewith.

Description of the preferred embodiment

Figure 1:
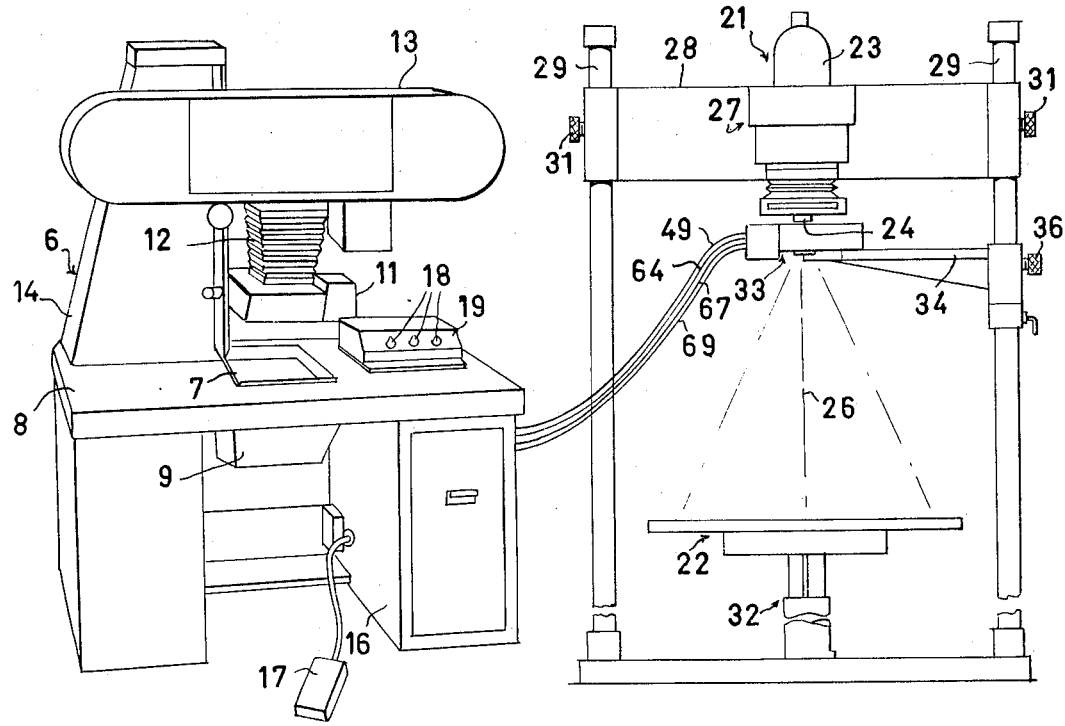
FIG. 1 is a front elevational view of an enlarger and printer embodying the invention shown electrically connected to one type of a conventional commercial printer which is shown in perspective.

While the invention may be adapted to be used alone or with a variety of commercial printers, it has been developed and is currently being used with a commercial printer 6 of a type shown generally in FIG. 1. Since this machine is a complex and sophisticated device and the details of its operation are not essential to an understanding of the invention, only a brief discussion of its operation will be included herein.

In the commercial printer shown, a negative is placed in a holder 7 positioned on the table top portion 8. Light from a source (not shown) located in a housing 9 is passed up through the negative and into the lens deck 11 where it is focused by a lens (not shown) and transmitted on up through the bellows 12 to form an image on photographic paper (not shown) within the housing 13.

The negative is visible to the operator when it is positioned in the holder 7, thus enabling the operator to clearly see the character and quality of the negative when the light passes therethrough, but the paper is enclosed in the housing and the passageway provided by the bellows is enclosed, thus precluding the dodging step and observation of the paper as the printing is effected. Elements of the automatic portion of the printer within the lens deck 11 may include a color compensator having a shutter and filters of different colors which are all movable into and out of the light path and a detector, or photoelectric cell, for determining the amounts of colors in a light beam passing along the light path.

The automatic elements in the lens deck 11 are operated by an electronic control circuit mounted within the pedestal 16 upon depression of the foot pedal 17. Before the exposure is begun the operator may observe the negative as it is positioned in the holder 7 over the light in the housing 9, and if he observes a gross irregularity in the color pattern of the negative, he may adjust the control circuit through the knobs 18 on the control panel to compensate for this irregularity.

While the invention may take many forms, as developed and commercially used, it utilizes a conventional enlarger 21 and a conventional easel 22.

The requirements for the enlarger 21 are only that it have a source of white light (not shown), contained in a housing 23, a lens 24 positioned an adjustable distance from the source to form a primary light path 26 from the source through the lens and a holder 27 by which a negative may be positioned in the path 26 between the light source and the lens 24. It may also be supported by any convenient method which permits the enlarger to be moved in a direction parallel to the light path 26. Such a support may be accomplished by affixing the enlarger 21 to a beam 28 which is mounted for motion on a pair of posts 29. The enlarger 21 may then be fastened at any desired point along the posts 29 by set screws 31 mounted in the beam 28 and tightenable against the posts 29.

The easel 22 need only have suitable means for positioning printing paper of any desired size within the light path 26. It may be adapted for the use of roll paper, as is the conventional Nord easel, but this is not necessary and such an easel is not shown in FIG. 1. The mount 32 by which the easel 22 is supported may also allow motion along the path 26. Means for moving the holder 27 toward and away from the paper, or for moving the easel relative to the holder are found in one form or another in most conventional enlargers, and a substantially infinite number of enlarged images may be produced according to the size of the paper, the distance of the paper from the lens, and the focal lengths of the lens, inasmuch as lens of different focal lengths may be used.

Figure 2:
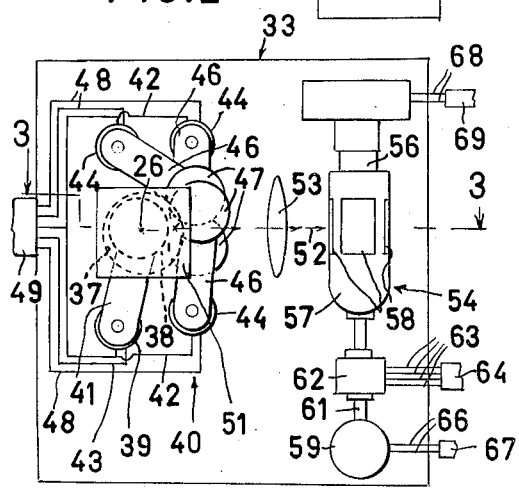
FIG. 2 is a bottom plan view of a deck assembly which may be utilized in the invention.

The conventional enlarger 21 and easel 22 are adapted for automatic color printing and enlarging by the addition of a deck assembly 33 (FIGS. 1 and 2) which is positionable in the light path 26 between the enlarger and the easel. The deck assembly 33 may be held in this position by a bar 34 which in turn is supported on one of the posts 29. Since it is preferable that the deck assembly be positioned close to the lens 24 but not in contact with it when color prints are being made, the bar 34 is movable on the post 29 in a direction parallel to the light path 26 so that motion of the enlarger along the posts 29 and of the lens 24 with respect to the enlarger is allowed. Further, the bar 34 may be rotated about the post 29 so that the deck assembly 33 may be swung out of the path 26 to a position remote from the path when the enlarger is used for making black and white enlargements. A set screw 36 mounted on the bar 34 for motion into engagement with the post 29 allows the deck assembly 33 to be firmly held in any desired position.

The deck assembly 33 may take any form which will provide the required function of adapting a conventional enlarger to automatic color printing. For simplicity of description, the form shown in FIGS. 2, 3 may be the same as the deck assembly 11, only inverted. It incorporates what has hereinbefore been generally described, and it is to be understood that the assembly may have different arrangements, provided the essential elements are present.

Upon leaving lens 24, light rays travelling along path 26 enters the deck assembly 33 through a hole 37 and passes into the color compensator 40. The color compensator 40 includes a shutter 38, positionable in the path 26 when no exposure is being made, which is mounted on a solenoid 39 by a paddle 41 for movement out of the path 26 when the solenoid 39 is activated by a suitable signal on the wires 42 and 43. Also included in the color compensator 40 are three filters 47, similarly mounted on solenoids 44 by paddles 46 but positioned out of the path 26. Each of the filters 47 is individually movable into the path 26 when the solenoid upon which it is mounted has been activated by a suitable signal on wire 42 and the one of the wires 48 associated with it. The three filters 47 are colored, each having a different one of the three primary colors. The wires 42, 43 and 48 may be conveniently combined to form a cable 49, and it is through the wires in this cable that the electronic control circuit in pedestal 16 controls the actuation of the paddles 41, 46, and the filters on the latter.

Having passed through the color compensator 40, the color content of light travelling along the light path 26 is then detected, and this may be conveniently done by causing the light to encounter a beam splitter 51 by which a small portion of the light beam or rays is deflected from the path 26 to form a deflected path 52. The beam splitter 51 may be simply a piece of semi-transparent sheet material placed across the path 26 at an angle thereto so that the major portion of the light is transmitted thereby to continue along the path 26 to the paper on the easel 22 while a smaller portion thereof is reflected by the surface of the sheet to pass along the deflected path 52.

The rays of deflected light along path 52 may pass from the beam splitter 51 through a focusing lens 53 onto a detector, generally designated 54. The detector 54 may be comprised of a photoelectric cell 56 about which is rotated a shell 57 through which pass three windows 58 containing filters. Each of the filters in the windows 58 are of a different one of the three primary colors. The shell 57 is mounted on a shaft 61, for rotation by a motor 59, the shaft 61 passing through a sensor 62 by which a signal may be sent along wires 63 in the cable 64 representing which of the three windows 58 is in the deflected path 52 at any particular instant. The motor 59 receives its power through the wires 66 in the cable 67, and as the windows 58 and filters therein pass through the path 52, a sequence of signals representing the intensity of the light striking the photocell 56 are sent along the wires 68 in the cable 69 to the electronic control circuit in pedestal 16 for determining the necessary actuation of the filters 44 to provide the desired color balance in the print.

Different systems are employed in different commercial deck assemblies, or the equivalent, one of the most common being one in which one or more separate photoelectric cells, like cell 56 is employed for each filter in which each is colored to transmit a portion of the light rays thereto, instead of employing a revolving shell with the filters. The mechanics is different but the signals transmitted to the electronic control means 16 is substantially the same.

Figure 4:
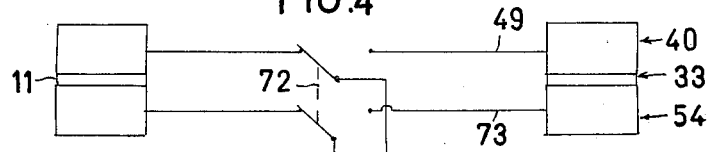
FIG. 4 is a block diagram of the electrical circuitry of the invention.
Figure 3:
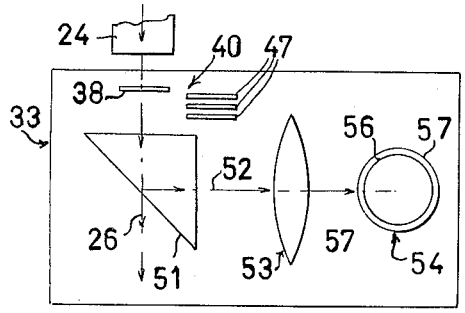
FIG. 3 is a diagrammatic sectional view of the deck assembly of FIG. 2 taken along line 3—3 in FIG. 2.

The deck assembly 33 is operated by a control circuit 71 (FIG. 4) which may be the one in the pedestal 16 of a commercial printer 6, as shown in FIG. 1. When this control circuit is a part of a commercial printer, it may be connected by suitable switching means 72 to operate alternatively either the lens deck 11 of the commercial printer or the deck assembly 33, as is diagrammatically shown in FIG. 4. The commercial printer will then operate normally when the switch 72 is in the position shown in FIG. 4, however, if the deck assembly 33 is desired, the switching means 72 may be moved to its alternative position. The control circuit 71 will then operate the motor 59 through the cable 67, receive signals as to the brightness of the various colors in the beam which has been deflected from the path 26 along the path 52 by the beam splitter 51 through cables 64 and 69, line 73 in FIG. 3 representing the combination of cables 67, 64 and 69, and from this information operate the color compensator 40 through the cable 49 by moving the appropriate filters 47 and the shutter 38 into and out of the path 26 to yield the correct exposure. Since the deck assembly 33 is not positioned against the lens 44, vibration in the deck assembly resulting from the motor 59 will not be transmitted thereto and a sharp picture will result.

When a commercial printer 6 is used with the invention, additional advantages are obtained because it may be used quickly and easily to make prints of the size for which it has been designed. Further, when the switch 72 has been moved to operate the deck assembly 33, the control panel 19 and foot peddle 17 still may be used to activate and adjust the control circuit 71. Thus a negative may be positioned in holder 7 and viewed by an operator with light passing from the source in housing 9 to determine if any adjustment from the knobs 18 will be needed while a print of another negative is being made utilizing the deck assembly 33.

The employment of the economical existing deck assembly 11 or its equivalent, now used in commercial automatic color printers with the conventional electronic control circuit such as in cabinet 16, in combination with a conventional black and white enlarger, enables the average photo developing and finishing establishment to provide color enlargements, heretofore automatically produced only in equipment costing thousands of dollars more than the small enlargers capable of producing prints on paper having a maximum width of 5 inches, on paper of any size including the maximum sizes adapted to be handled in the aforesaid expensive installations. However, the present combination also enables the user to quickly produce the usual black and white enlargements by the same enlarger or the same enlarging components heretofore used, and to adopt the same dodging technique whether the enlargement is in color or in black and white, and the time and expense heretofore incurred in making a series of test negatives and experimenting with filters and filter time is deleted, but the color enlargements are true in color. Finally, the operator may adopt the dodging technique to produce special desired effects or results, in the same manner as in making black and white enlargements, heretofore impossible in automatic color printers.

Where the combination of the small color printer 6 and the conventional enlarger 21 are used with the deck assembly 33, which is the same as deck assembly 11, is used on the enlarger 21 as hereinbefore described, the operator may not only view the negative in holder 7 on enlarger 6, but if desired may make one or more prints enlarged to the limit of enlarger 6 for study prior to making a large enlargement on enlarger 21. The negative may then quickly be placed in the holder on the enlarger 21, and the deck assembly 33 positioned as seen in FIG. 1 for making the larger enlargement. The knowledge or grading derived from the examination of the print in holder 7, and the print made in enlarger 6 may then be used as guides for dodging to obtain special effects during printing on enlarger 21, and this printing can be observed as it proceeds.

These results enable the accomplishment of results heretofore unattainable and enable the average size photographic developing and finishing establishment to consistently make true color enlargements, or color enlargements of any size and character heretofore capable of being made at a cost in equipment, time and materials that have been prohibitive.

Hereinafter, the term "color compensator" identifies the deck assemblies 11 and 33, and the term "electronic control unit" identifies the conventional control circuit in pedestal 16 or the equivalent, for receiving from the deck assembly the information as to the color characteristics and for automatically adjusting the color balance of the printing light according to the requirements of the negative.

It should be understood that the above detailed description discloses the preferred embodiment of the invention, but it is not intended to be limiting, as other forms of modification may occur to those skilled in the art which will not depart from the spirit of the invention and which come within the scope of the appended claims.

I claim:

1. In combination with a conventional color enlarger for making enlarged color prints, which enlarger includes a source of printing light, a negative carrier for the color negative to be enlarged, a first color compensator including a lens for light from said source, sampling filters and adjusting filters supported for movement across the printing light, and a photo multiplying cell for light sampled by said sampling filters; an electronic control unit electrically connected with said color compensator and photo multiplying cell for moving said adjustment filters across said printing light to automatically adjust the color balance of said printing light according to the requirements of the negative on said negative holder:

(a) a black and white color enlarger having an enlarging head provided with a source of printing light, a lens, a negative carrier in a position between said lens and said source for supporting a negative across and in a plane perpendicular to the optical axis of said lens, and a paper holder for printing paper, (b) a second color compensator substantially corresponding to said first color compensator, (c) a support for supporting said enlarger head, said second color compensator and said paper holder in spaced relation along the optical axis of said last-mentioned lens for projection of the printing light from said color compensator onto said paper holder with the space between said color compensator and said paper holder open and accessible for manual dodging and for viewing paper on said paper holder during the printing, (d) said negative holder on said color enlarger being unobstructed for visual observation by an operator upon passage of light through to said first color compensator to enable an operator to grade the colors of said negative prior to printing on said black and white enlarger, (e) means for electrically connecting said second color compensator with said electronic control unit whereby the color balance of the printing light passing through said second color compensator from said head will be automatically adjusted according to the requirements of a color negative on the negative carrier on said black and white enlarger, (f) means for supporting said second color compensator on said support for movement into and out of a position on the optical axis of the lens of said black and white enlarger, and means for supporting said enlarger head on said support for movement axially of said axis, whereby black and white enlargements or color enlargements of a plurality of sizes may be produced by said color enlarger.

2. In the combination as defined in claim 1;

(g) said automatic color enlarger including a color control box assembly electrically connected with said electronic control unit, and having manually actuatable means for varying the operation of said electronic control unit to compensate for gross color imbalance in one or more colors in the negative that is on the negative holder of said color enlarger or the negative holder on said black and white enlarger, whereby a small test print may be made on said color enlarger prior to making a substantially larger print on said black and white enlarger.

3. In the combination as defined in claim 1;

(h) said color enlarger including means for supporting said source of printing light, negative carrier, color compensator and lens for vertical upward projection through said negative onto paper enclosed in an overhead magazine, and an enclosed overhead paper being carried on said support for supporting printing paper on the optical axis of said lens above said lens, said printing paper when in printing position in said magazine being inaccessible for visual observation, and said negative holder on said black and white enlarger being inaccessible for visual observation, whereby a negative in the negative holder of said color enlarger provides for the sole visual examination of the color enlargement.

4. In combination with a conventional color compensator and electronic control unit for automatically adjusting the color balance of the printing light of an enlarger, when said light is projected from an enlarger through a color negative and onto color printing paper for making a color enlargement:

(a) an enlarger for making black and white enlarged prints, including an enlarger head having thereon a source of printing light, a lens holder and a negative holder spaced along the optical axis of said lens and a paper holder for color printing paper spaced a substantial distance from said head along said axis for supporting said printing paper to receive the light image of said negative projected from said lens to provide a color print, (b) a support supporting said head and said paper holder for movement relative to each other along said axis with said negative holder inaccessible for visual observation and with the space between said head and said paper holder unobstructed for visual observation of paper on said paper holder during printing on said paper, (c) means for supporting said color compensator in a position adjacent said lens between the latter and said paper holder and across the optical axis of said lens for automatically adjusting the color balance of the printing light passing through a color negative on said negative holder and through said lens onto said printing paper, (d) means supporting said electronic control unit separate from said color compensator and enlarger, (e) conductor wires electrically connecting said color compensator with said control unit for activating said color compensator to rectify imbalances in the light rays of diffeernt colors projected onto the printing paper on said paper holder.

5. In the combination as defined in claim 4;

(f) said means supporting said electronic control unit separate from said color compensator comprising a second color compensator in an automatic conventional color printer that includes a paper holder, lens and negative holder restricted to making enlarged color prints of substantially less size than prints made by said enlarger, (g) means for selectively connecting said control unit with said second color compensator and with the color compensator on said enlarger to enable making color prints of different sizes electrically connected with the same control unit.

6. In the combination as defined in claim 4;

(h) said means for supporting said color compensator on said support for swinging said color compensator to and from said position extending across said optical axis for making black and white enlargements or color enlargements as desired.

References Cited
UNITED STATES PATENTS 3,100,419   8/1963   Clapp _____ 355—38
3,292,488   12/1966  Griffith _____ 355—38
3,359,424   12/1967  Dreyfoos _____ 355—38 X NORTON ANSHER, Primary Examiner R. A. WINTERCORN, Assistant Examiner U.S. Cl. X.R.
355—41, 68